United States Patent [19]

Valizadeh

[11] Patent Number: 5,765,032
[45] Date of Patent: Jun. 9, 1998

[54] PER CHANNEL FRAME QUEUING AND SERVICING IN THE EGRESS DIRECTION OF A COMMUNICATIONS NETWORK

[75] Inventor: Homayoun S. Valizadeh, San Ramon, Calif.

[73] Assignee: Cisco Technology, Inc., San Jose, Calif.

[21] Appl. No.: 586,939

[22] Filed: Jan. 11, 1996

[51] Int. Cl.[6] .............................. G06F 13/14; H04L 12/56
[52] U.S. Cl. ........................... 395/200.65; 395/200.62; 395/200.3; 395/200.68; 395/200.7; 370/413; 370/412; 370/235; 370/395
[58] Field of Search ....................... 395/200.01, 200.11, 395/200.3, 200.54, 200.65, 200.62, 200.61, 200.66–200.69, 200.7, 200.72, 200.79; 370/397, 396, 398–399, 389, 351, 412, 474, 229, 230, 231, 232, 235, 413

[56] References Cited

U.S. PATENT DOCUMENTS

| | | | |
|---|---|---|---|
| 5,224,099 | 6/1993 | Corbalis et al. | 370/94.2 |
| 5,313,454 | 5/1994 | Bustini et al. | 370/231 |
| 5,317,562 | 5/1994 | Nardin et al. | 370/16 |
| 5,359,592 | 10/1994 | Corbalis et al. | 370/17 |
| 5,390,175 | 2/1995 | Hiller et al. | 370/398 |
| 5,453,981 | 9/1995 | Katsube et al. | 370/397 |
| 5,509,007 | 4/1996 | Takashima et al. | 370/391 |
| 5,513,178 | 4/1996 | Tanaka | 370/395 |
| 5,528,592 | 6/1996 | Schibler et al. | 370/397 |
| 5,572,523 | 11/1996 | Katsube et al. | 370/231 |
| 5,579,302 | 11/1996 | Banks | 370/17 |
| 5,623,493 | 4/1997 | Kagemoto | 370/397 |
| 5,629,928 | 5/1997 | Calvignae et al. | 370/237 |

FOREIGN PATENT DOCUMENTS

| | | |
|---|---|---|
| 593843 | 4/1994 | European Pat. Off. |
| 9414263 | 6/1994 | WIPO |
| 9700278 | 1/1997 | WIPO |

*Primary Examiner*—James P. Trammell
*Assistant Examiner*—Tuan Q. Dam
*Attorney, Agent, or Firm*—Blakely, Sokoloff, Taylor & Zafman LLP

[57] ABSTRACT

A method for queuing and servicing egress traffic of a network. A first set of n egress queues that are each coupled to store frames received from a corresponding one of a set of n receive channels are provided, and a distinct set of queuing parameters is maintained for each of the first set of n egress queues. A second set of m egress queues each coupled to store frames for transmission to a corresponding one of a set of m transmit channels are also provided, wherein m is less than n. The first set of n egress queues are serviced to fill the second set of m egress queues using a first service algorithm and the sets of queuing parameters for each of the first set of n egress queues.

18 Claims, 5 Drawing Sheets

PER CHANNEL FRAME QUEUING AND SERVICING IN THE EGRESS DIRECTION OF A COMMUNICATIONS NETWORK

FIELD OF THE INVENTION

The present invention pertains to the field of communication systems and more particularly to per channel frame queuing and servicing in the egress direction of a communications network.

BACKGROUND

Asynchronous Transfer Mode (ATM) networks are often used by telecommunication service providers to transfer digital information over long distances on a demand driven basis. ATM networks are cell switching networks that transfer fixed length packets or "cells" in a time multiplexed manner using a plurality of virtual paths ("VPs") and virtual channels ("VCs") defined within the physical transmission medium of the network.

Communication controllers act as end nodes of common carrier ATM networks and provide entry points so that customers may use the ATM networks. A communication controller connects to an ATM network using a set of one or more common carrier communication links such as high speed T3 or E3 lines, wherein customer premises equipment (i.e. user networks and devices) is typically connected to a communication controller using lower speed links such as T1 or E1 lines.

A common carrier ATM network and customer premises equipment operate asynchronously, typically at different data rates, and often using different communications protocols. Therefore, communication controllers must provide the necessary services and facilities 1) for ensuring that data received from the customer premises equipment (i.e. "ingress traffic") is transmitted correctly over the ATM network and 2) for ensuring that data received from the common carrier ATM network (i.e. "egress traffic") is transmitted correctly to the customer premises equipment. Three basic services that a typical communication controller will provide are segmentation and reassembly, multiplexing and demultiplexing, and storing and forwarding (buffering). Another type of service that is often provided is congestion control.

A communication controller typically includes a segmentation and reassembly (SAR) unit that packs data into cells for transmission over the ATM network and that packs data into appropriately sized units or "frames" for transmission to the customer premises equipment. For ingress traffic, the SAR unit segments frames into cells wherein each cell created by the SAR unit is specified for transmission over a particular VC or VP by appropriately setting the virtual channel identifier (VCI) or virtual path identifier (VPI) in the header of the cell. In this manner, the ingress traffic is multiplexed for transmission over the ATM network. Ingress queues are provided for each VC to store cells until they may be transmitted.

For egress traffic, the SAR unit reassembles previously segmented frames using the received cells. Each frame reassembled by the SAR unit is stored in a selected one of a set of egress queues, wherein each egress queue typically corresponds to a logical channel or port of the customer premises equipment. In this manner, the egress traffic is demultiplexed for transmission to the customer premises equipment. One problem with prior approaches to egress queuing and demultiplexing is that multiple VCs may be associated with a particular logical channel of the customer premises equipment, and fair access to that logical channel for all of the VCs is not be assured.

SUMMARY AND OBJECTS OF THE INVENTION

Therefore, it is an object of the present invention to provide an improved buffering and servicing scheme in the egress direction.

This and other objects of the invention are provided by a method for queuing and servicing egress traffic of a network. A first set of n egress queues that are each coupled to store frames received from a corresponding one of a set of n receive channels are provided, and a distinct set of queuing parameters is maintained for each of the first set of n egress queues. A second set of m egress queues each coupled to store frames for transmission to a corresponding one of a set of m transmit channels are also provided, wherein m is less than n. The first set of n egress queues are serviced to fill the second set of m egress queues using a first service algorithm and the sets of queuing parameters for each of the first set of n egress queues. In this manner, a certain level of fairness may be maintained as between multiple receive channels that are mapped for output via the same transmit channel.

According to an alternative embodiment, only one set of m egress queues is provided to store frames for transmission to a corresponding one of a set of m transmit channels. A distinct set of queuing parameters are maintained for each of a set of n receive channels, and the set of m egress queues is filled using a first service algorithm and the sets of queuing parameters for each of the set of n receive channels. Again, a certain level of fairness is provided between multiple receive channels that are mapped for output via the same transmit channel.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Schemes for queuing digital information in a communications controller are described wherein an additional set of egress queues called "channel" queues that each buffer digital information received from a corresponding one of n receive channels of a network are introduced in the egress path between the receive processor and the m port queues that buffer digital information for transmission over the m transmit channels of the customer premises equipment. Each port queue is filled using digital information buffered by a selected subset of the channel queues. Each channel queue has its own set of queuing parameters that may be defined to ensure that each channel of a subset of channels that are mapped to the same port is given a fair opportunity to transmit to the corresponding port queue. According to an alternative embodiment, only port queues are provided, but a distinct set of queuing parameters are provided for each receive channel such that access to the port queues may be controlled.

According to the presently described embodiments, the network is an ATM network, and the customer premises equipment comprises a Frame Relay network. Each channel queue corresponds to one of the n VCs of the ATM network, and each port queue corresponds to one of the m logical ports that services a logical channel of the Frame Relay network. For the sake of simplifying discussion, the number of VCs n is assumed to exceed the number of logical ports m such that each logical port receives frames received from multiple VCs. The queuing and servicing schemes described herein may be readily adapted to any system wherein additional granularity is desired for ensuring fairness when data received from multiple receive channels is to be transmitted over a single transmit channel.

Figure 1:
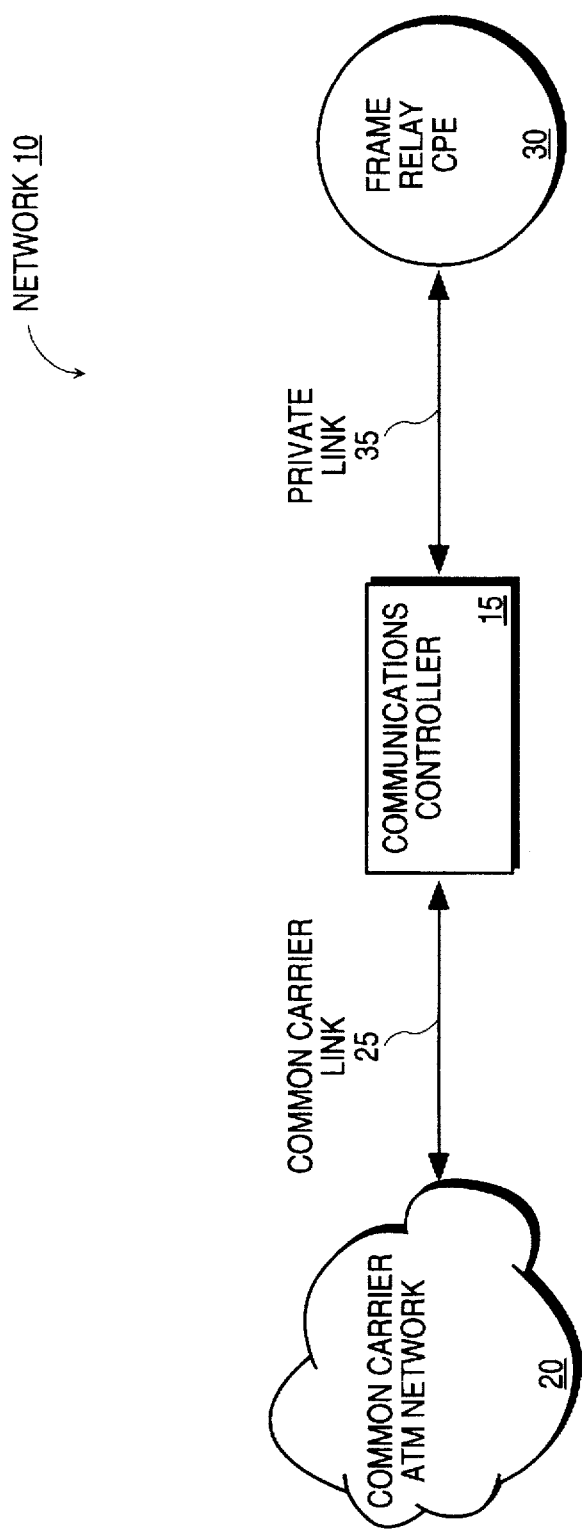
FIG. 1 shows a network that includes a communications controller that interconnects a common carrier network and customer premises equipment.

FIG. 1 shows a network 10 that comprises a communications controller 15 that interconnects a common carrier ATM network 20 and a customer premises equipment (CPE) 30 that operates according to the Frame Relay standard protocol. Communications controller 15 is connected to ATM network 20 by common carrier link 25, which may be, for example, a T3 line. CPE 30 is connected to communication controller 15 by a private link 35, which may be, for example, a T1 line. Communications controller 15 may also be linked to other CPEs (not shown).

Figure 2:
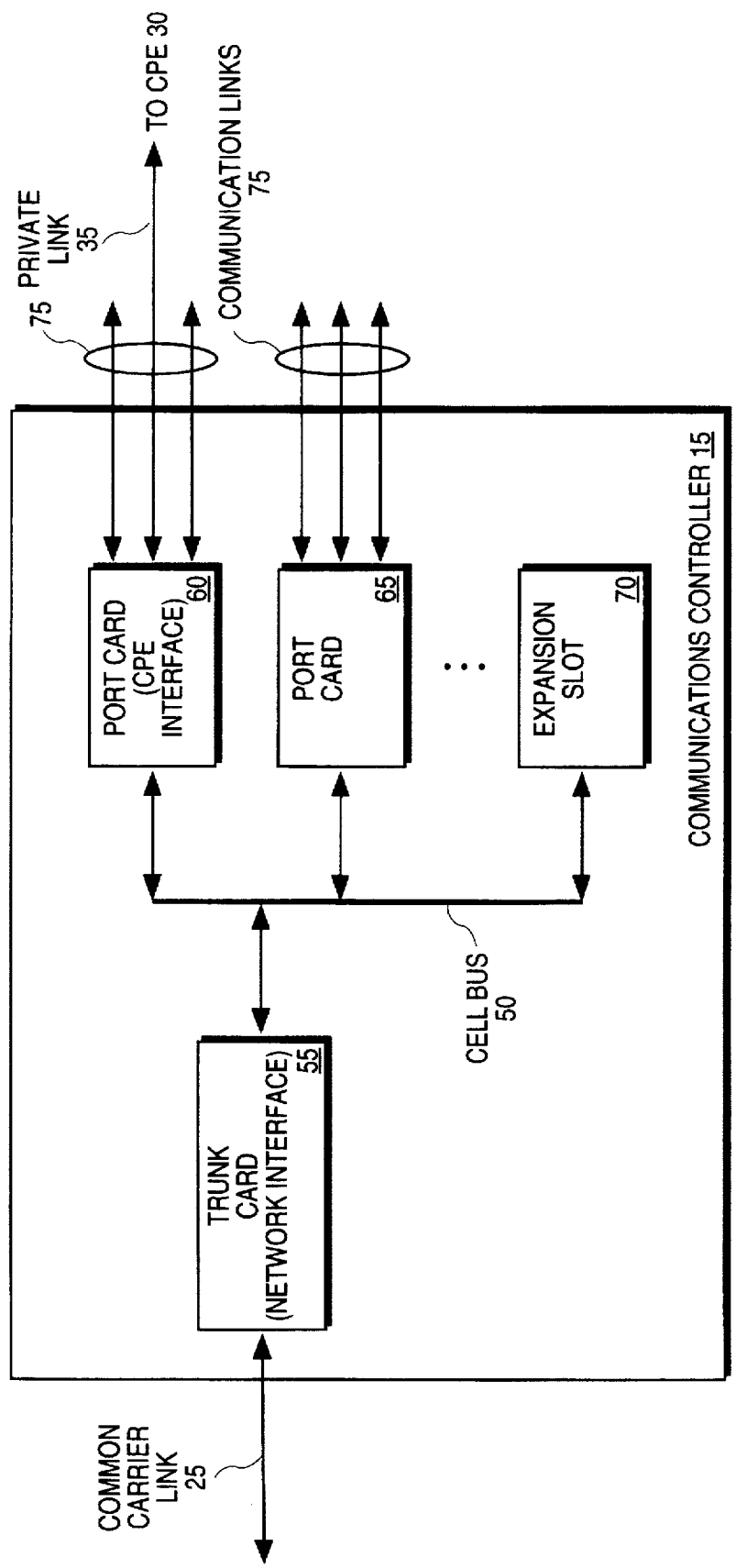
FIG. 2 shows a communications controller of one embodiment.

FIG. 2 shows a communications controller in greater detail. According to the present embodiment, communications controller 15 includes a bi-directional cell bus 50 that operates according to the ATM standard protocol. Cell bus 50 is implemented as a backplane bus to provide scalability of communications controller 15. A trunk card 55 that operates as a network interface is coupled to common carrier link 25 and cell bus 50 for receiving ATM cells from ATM network 20. Trunk card 55 transmits received cells to the port cards using cell bus 50.

Port cards 60 and 65 operate as CPE interfaces for coupling to CPEs via communication links 75. For example, port card 60 is coupled to CPE 30 via private link 35. The port cards distribute cells received from cell bus 50 to the appropriate CPEs by using communication links 75. It is possible that each communication link of a port card is time division multiplexed into a plurality of "logical" communication channels, and each physical port that is connected to receive a communication link may be viewed as a multiplicity of logical ports coupled to service the logical channels of the communication link.

One or more expansion slots 70 may be provided to receive additional port cards. Furthermore, new port cards may be swapped with port cards 60 and 65 should port cards 60 and 65 fail or the configuration of the CPEs change. For example, port card 60 includes multiple physical ports for linking to CPEs that operate according to the Frame Relay standard, and a user may replace port card 60 with an alternative port card that includes multiple physical ports for linking to CPEs that operate according to the ATM standard protocol should the user's needs change.

Wherein communication between CPEs and the ATM network is bi-directional, the following discussion only details traffic flow and queuing schemes for use in the egress direction from the ATM network 20 to the CPE 30. Queuing and servicing in the ingress direction may be done according to any appropriate method.

Figure 3:
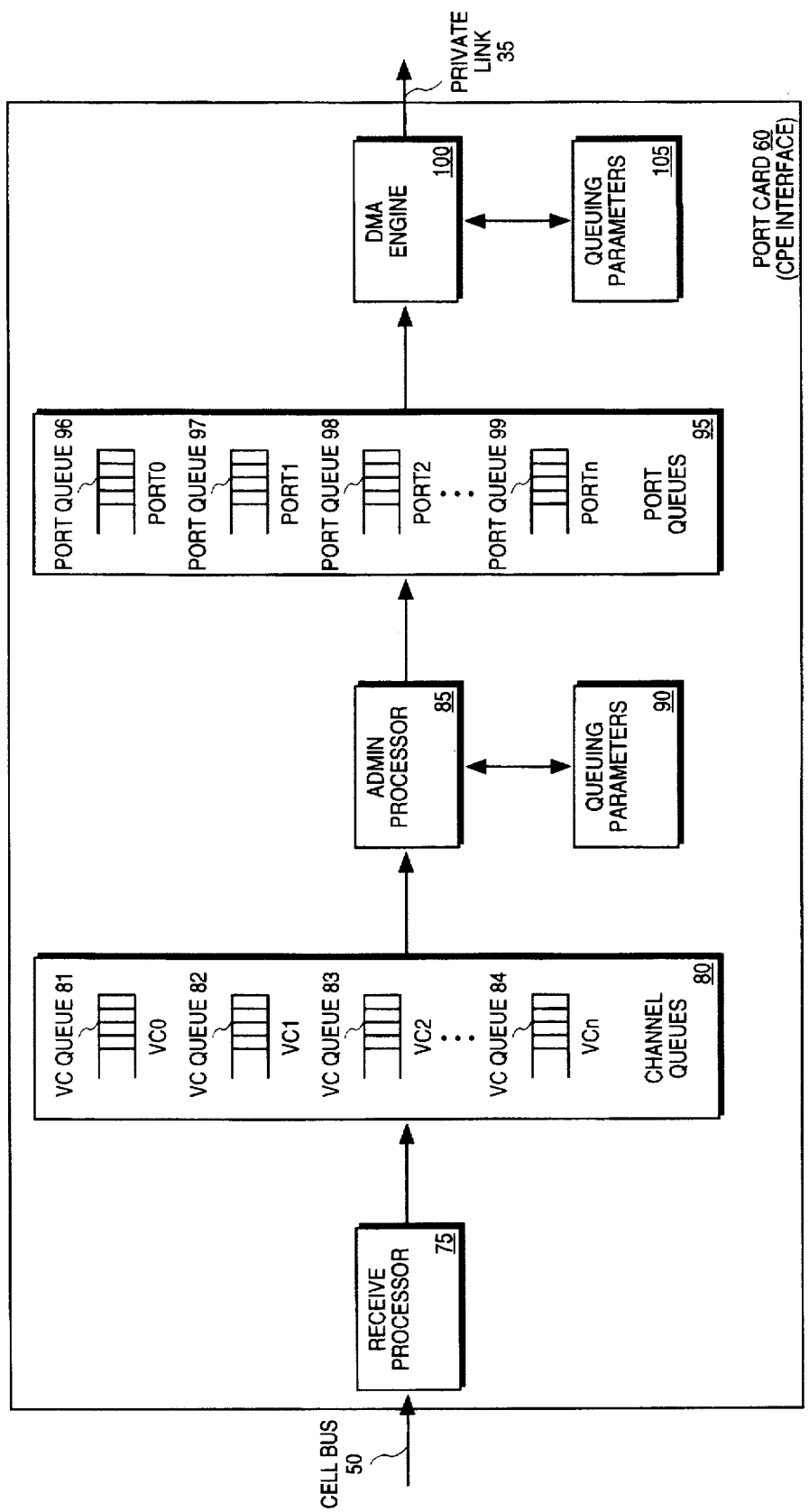
FIG. 3 shows a port card that uses a two-level queuing and servicing scheme of one embodiment.

FIG. 3 shows a port card in greater detail. As shown, port card 60 includes a receive processor 75 that is coupled to receive cells from cell bus 50 in a first in, first out manner. Receive processor 75 is configured to perform the SAR unit function of reassembling received cells into frames. According to the present embodiment, each frame is a T1 frame. A set of channel queues 80, one queue for each of n VCs, are provided, and receive processor 75 buffers ("enqueues") a reassembled frame into the channel queue that corresponds to the VC from which the frame was received. For example, channel queue 81 buffers frames received from VC0, channel queue 82 buffers frames received from VC1, channel queue 83 buffers frames received from VC2, and channel queue 84 buffers frames received from VCn. If a channel queue is full when receive processor 75 attempts to enqueue a frame, that frame is dropped. As previously described, cell bus 50 operates according to the ATM standard protocol, and receive processor 75 sorts reassembled frames into the appropriate channel queues according to the values stored in the VCI and VPI fields of the cell headers.

An administrative ("admin") processor 85 is coupled to transmit buffered frames from the channel queues 80 to the port queues 95, wherein each port queue corresponds to a logical port of port card 60. Admin processor 85 services each channel queue by implementing a service algorithm that uses queuing parameters 90 specific to that channel queue. Any desired service algorithm may be used. The queuing parameters 90 for all the channel queues are maintained by admin processor 85 and stored in memory (not shown), and a single microprocessor may perform the functions of both the receive processor 75 and the admin processor 85.

Direct memory access (DMA) engine 100 is responsible for servicing the port queues 95 according to queuing parameters 105 specified for each logical port queue. DMA engine 100 may service the port queues 95 using any desired servicing method or algorithm, including those found in the prior art.

The channel queues 80 and the port queues 95 may be implemented using any reasonable method. According to the present embodiment, the channel and port queues are maintained by forming linked lists of buffers from a common free buffer pool. The buffer pool is maintained using a one or more random access memory (RAM) devices. A separate buffer pool may be maintained for each of the set of channel queues and the set of port queues.

Figure 4:
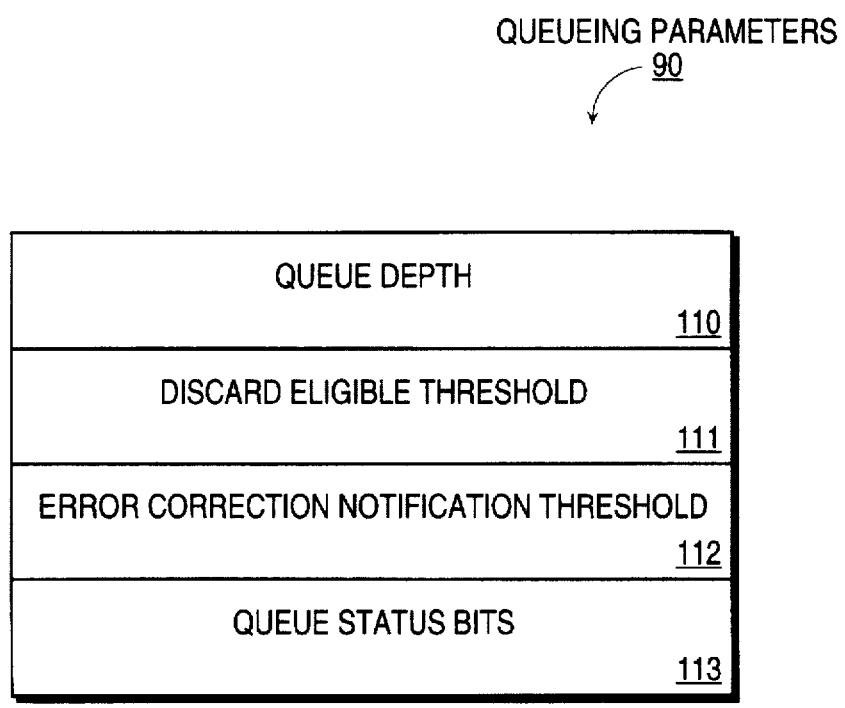
FIG. 4 shows queuing parameters of one embodiment as maintained by the admin processor.

FIG. 4 shows an exemplary set of queuing parameters maintained by admin processor 85. Admin processor 85 maintains a distinct set of queuing parameters 90 for each channel queue. Each set of queuing parameters 90 includes a queue depth parameter 110, a discard eligible threshold parameter 111, an error correction notification threshold parameter 112, and a set of queue status bits 113. The queue depth parameter 110 indicates a maximum number of bytes in the corresponding channel queue that are available for buffering frames received from the corresponding virtual channel.

For one embodiment, the queue status bits 113 include a discard eligible (DE) status bit along with forward explicit congestion notification (FECN) and backward congestion notification (BECN) status bits for the corresponding VC. The admin processor 85 updates the DE, FECN, and BECN status bits on a per-VC basis as the corresponding threshold parameters are exceeded in the corresponding channel queue. For example, the admin processor 85 sets the DE status bit for a VC if the corresponding discard eligible threshold for that VC is exceeded as the admin processor 85 transfers a frame from the channel queue of VC to the appropriate port queue. The admin processor 85 similarly updates the FECN and BECN status bits for a particular VC as the error correction notification threshold for that VC is exceeded.

Queuing and servicing frames on a per-channel (or per-VC) basis provides greater granularity when implementing congestion control such that fairness may be ensured as between multiple channels (or VCs) that are mapped to a single logical port. For example, according to one implementation, VCs 0–2 might be mapped to logical port 0. According to prior single level queuing schemes, all traffic from VCs 0–2 would be reassembled and buffered in the port queues on a first come, first served basis. It is possible that VC0 could be transmitting high amounts of communications traffic to logical port 0 such that frames received from VC0 alone would fill the port queue of logical port 0 and frames from VCs 1 and 2 would be dropped. By providing the intermediate level of channel queuing and servicing described herein, congested VCs can be prevented from blocking other VCs from accessing the same logical port.

Figure 5:
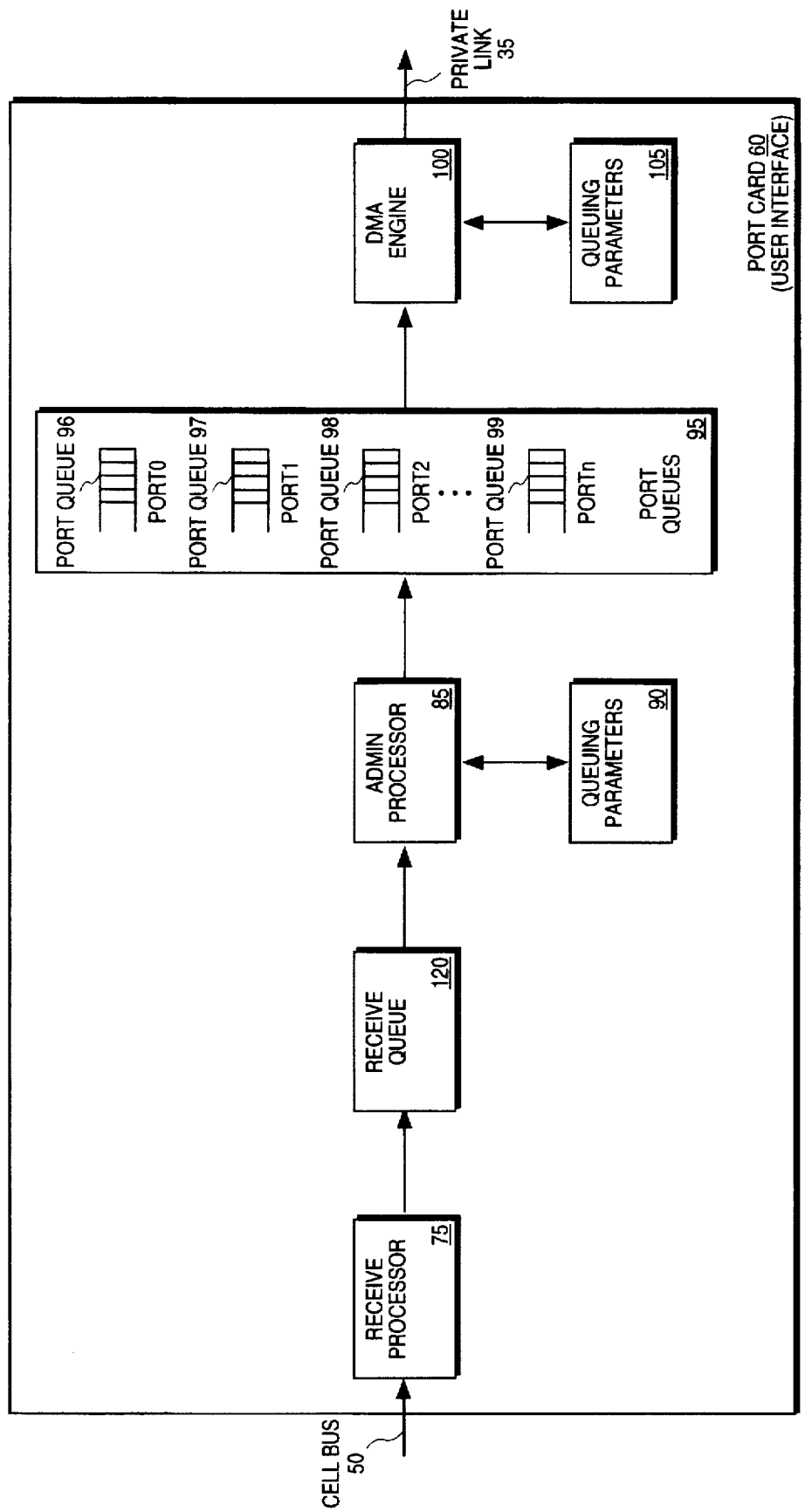
FIG. 5 shows an alternative embodiment wherein a common receive queue stores received and reassembled frames.

FIG. 5 shows an alternative embodiment wherein a common receive queue 120 stores received and reassembled frames. Wherein frames are not stored in separate channel queues, each frame includes a logical identifier comprising a combination of the VPI and the VCI found in each cell header for the segmented frame. Admin processor 85 continues to maintain queuing parameters 90 on a per-channel basis such that a certain level of additional granularity in congestion control is maintained; however, the use of channel queues provides additional flexibility at the expense of additional procession overhead.

In the foregoing specification the invention has been described with reference to specific exemplary embodiments thereof. It will, however, be evident that various modifications and changes may be made thereto without departing from the broader spirit and scope of the invention. The specification and drawings are accordingly to be regarded as illustrative rather than a restrictive sense.

What is claimed is:

1. A method for queuing and servicing egress traffic of a network, comprising:

receiving first units of data supplied via a plurality of receive channels;

queuing each unit of the first units of data in one of a first plurality of egress queues according to which of the plurality of receive channels supplied the unit of data;

maintaining a distinct set of queuing parameters for each of the first plurality of egress queues;

removing the first units of data from the first plurality of egress queues based on a first service algorithm and the sets of queuing parameters maintained for the first plurality of egress queues;

queuing each unit of the first units of data removed from the first plurality of egress queues in one of a second plurality of egress queues according to which of a plurality of transmit channels the unit of data is destined;

maintaining a set of queuing parameters for each of the second plurality of egress queues;

removing the first units of data from the second plurality of egress queues based on a second service algorithm and the set of queuing parameters maintained for the second plurality of egress queues; and transmitting the first units of data removed from the second plurality of egress queues via the plurality of transmit channels.

2. The method of claim 1 wherein the step of receiving first units of data supplied via the plurality of receive channels includes the steps of: receiving second units of data via the plurality of receive channels; and generating the first units of data based on the second units of data.

3. The method of claim 2 wherein the step of receiving seconds of units of data includes the step of receiving cells of data from an asynchronous transfer mode network, and wherein the step of generating the first units of data includes the step of assembling the cells of data into frames of data formatted according to a frame relay protocol.

4. The method of claim 1 wherein the second plurality of egress queues includes less queues than the first plurality of egress queues.

5. A method for queuing and servicing egress traffic of an asynchronous transfer mode (ATM) network, comprising:

providing a set of channel queues each coupled to store frames assembled from data received from a corresponding one of n virtual channels;

maintaining a distinct set of queuing parameters for each of the channel queues;

providing a set of port queues each coupled to store frames for transmission over a corresponding one of a plurality of logical ports;

transferring frames from the channel queues to the port queues based on a first service algorithm and the sets of queuing parameters, each of the frames being transferred to one of the port queues according to which of the plurality of logical ports the frame is destined;

maintaining a distinct set of queuing parameters for each of the port queues; and transmitting frames from the port queues via the plurality of logical ports based on a second service algorithm and the queuing parameters of the port queues.

6. An arrangement for queuing and servicing egress traffic directed from a network to customer premise equipment, the arrangement comprising:

a receive processor to assemble packets received from a plurality of receive channels of the network into frames, each frame being assembled based upon a respective set of the packets;

a first plurality of egress queues to store the frames assembled by the receive processor, each of the frames being stored in one of the first plurality of egress queues according to which of the plurality of receive channels received the respective set of the packets;

a second plurality of egress queues to store frames removed from the first plurality of egress queues prior to transmission via one of a plurality of transmit channels of the customer premise equipment, each of the frames being stored in one of the second plurality of egress queues according to which of the plurality of transmit channels the frame is destined;

an administrative processor to transfer the frames removed from the first plurality of egress queues to the second plurality of egress queues based on respective sets of queuing parameters maintained for each of the first pluralities of egress queues.

7. The arrangement of claim 6 further comprising a direct memory access (DMA) engine coupled to the second plurality of egress queues, the DMA engine maintaining a distinct set of queuing parameters for each of the second plurality of egress queues and servicing the second plurality of egress queues using according to sets of queuing parameters for the second plurality of egress queues to transfer frames from the second plurality of egress queues via the plurality of transmit channels.

8. The arrangement of claim 6 wherein the receive processor and the administrative processor are both implemented by a single processing device.

9. An arrangement for queuing and servicing egress traffic directed from an asynchronous transfer mode (ATM) network to customer premise equipment, comprising:

a receive processor to assemble cells received from receive channels of the ATM network into frames, each frame being assembled from a respective set of cells;

channel queues to store the frames assembled by the receive processor, each of the frames being stored in one of the channel queues according to which of the receive channels received the respective set of cells;

port queues to store frames removed from the channel queues prior to transmission via one of a plurality of ports to the customer premises equipment, each of the frames being stored in one of the port queues according to which of the plurality of ports the frame is destined; and an administrative processor to transfer the frames removed from the channel queues to the port queues based on respective sets of queuing parameters maintained for each of the port queues.

10. The arrangement of claim 9 further comprising a direct memory access (DMA) engine coupled to the port queues, the DMA engine maintaining a distinct set of queuing parameters for each port queue and transferring frames from the port queues to the plurality of ports based on the sets of queuing parameters.

11. The arrangement of claim 9 wherein the receive processor and the administrative processor are both implemented by a single processing device.

12. A method for queuing and servicing egress traffic of a network, comprising:

receiving cells of data via n receive channels;

maintaining n sets of queuing parameters for the n receive channels, respectively;

assembling the cells of data into frames of data formatted according to a frame relay protocol; and queuing the frames of data in m egress queues for transmission via a corresponding one of m transmit channels, m being greater than one and less than n, each of the frames being stored in the m egress queues according to a service algorithm and one set of the n sets of queuing parameters.

13. A method comprising the steps of:

receiving cells of data supplied via channels of an asynchronous transfer mode network;

assembling the cells into frames of data according to a frame relay protocol, each frame being assembled from a respective set of the cells;

storing each of the frames in one of a plurality of channel queues according to which of the channels supplied the respective set of the cells;

removing the frames from the plurality of channel queues based on a service algorithm;

storing each of the frames in one of a plurality of port queues according to which of a plurality of ports to a frame relay network the frame is destined; and outputting the frames from the plurality of port queues via the plurality of ports.

14. A communications controller comprising:

a plurality of receive channels to receive first units of data;

a first processing unit to generate second units of data based on the first units of data;

a first plurality of queues to store each one of the second units of data according to which of the plurality of receive channels received a set of the first units of data used to generate the one of the second units of data;

a second plurality of queues;

a plurality of outputs coupled to the second plurality of queues; and a second processing unit to remove the second units of data from the first plurality of queues and to store each of the removed second units of data in one of the second plurality of queues according to which of the outputs the second unit of data is destined.

15. The communications controller of claim 14 wherein the second processing unit removes the second units of data from the first plurality of queues based on a service algorithm and queuing parameters maintained for the first plurality of queues.

16. The apparatus of claim 14 wherein the first processing unit and the second processing unit are implemented by a single processor.

17. The apparatus of claim 14 wherein the first units of data are cells received from an asynchronous transfer mode network and the second units of data are frames according to a frame relay protocol, and wherein the first processing unit assembles the frames based on respective sets of the cells.

18. The apparatus of claim 14 wherein the number of queues in the first plurality of queues is greater than the number of queues in the second plurality of queues.

* * * * *